Feb. 27, 1968      C. S. ANDERSEN      3,371,155
DISPLAY MECHANISM AND APPARATUS
Filed May 27, 1964      3 Sheets-Sheet 1
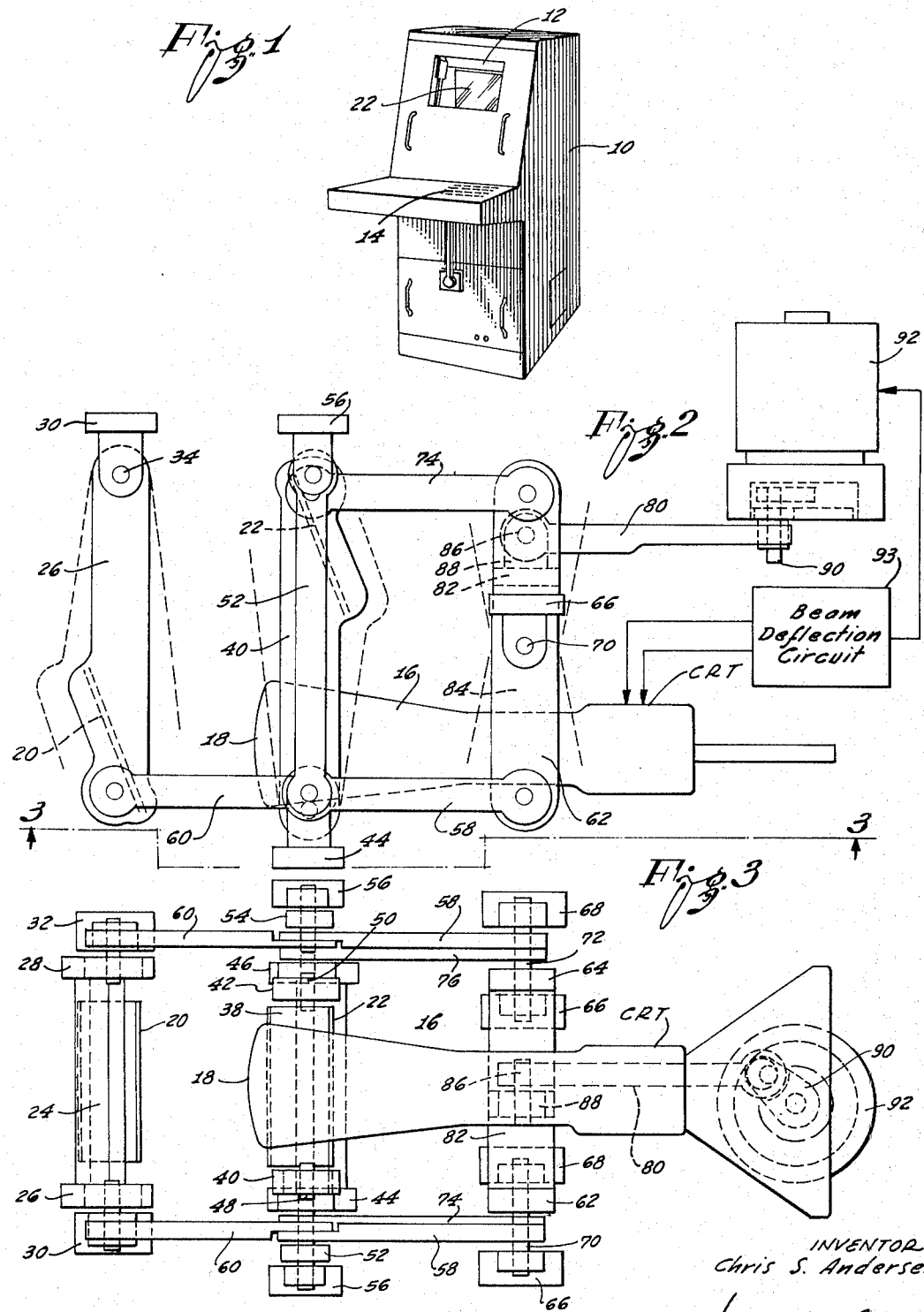
INVENTOR:
Chris S. Andersen
By Warren T. Jessup
Attorney INVENTOR:
Chris S. Andersen
By Warren T. Jessup
Attorney

CHRIS S. ANDERSEN, INVENTOR.

BY Warren T. Jessup
ATTORNEY.

United States Patent Office 3,371,155
Patented Feb. 27, 1968

3,371,155
DISPLAY MECHANISM AND APPARATUS
Chris S. Andersen, 4517 Clara St., Bell, Calif. 90201
Continuation-in-part of application Ser. No. 187,730,
Apr. 16, 1962. This application May 27, 1964, Ser.
No. 373,597
18 Claims. (Cl. 178—6.5)

The present invention relates to cathode-ray tube display systems and apparatus, and it relates more particularly to an improved mechanism for providing a three-dimensional representation of information displayed on the screen of a cathode-ray tube.

This application is a continuation-in-part of application Ser. No. 187,730, filed Apr. 16, 1962 and now abandoned.

The apparatus and mechanism of the invention provides a third dimension to the representation on the screen of the cathode-ray tube by effectively changing the apparent distance between the viewer and the screen in a controlled manner.

This controlled change in the apparent distance between the viewer and the display screen is effectuated, in the embodiments to be described, by a pair of mirrors. The mirrors are pivotally mounted in the apparatus of the particular embodiment so that they can be controllably moved back and forth with respect to one another, so as to compensate for rotational displacements. That is, the mirrors are controlled to move towards one another in half of each operating cycle and away from one another in the other half of each operating cycle. In a second embodiment the curvature of the mirrors is cyclically changed so as to change their focus and thus give the effect of a cyclic change in apparent distance between the object (screen) and the viewer.

The screen of the cathode-ray tube is positioned to face one of the two mirrors in the apparatus, and the display on the screen of the tube is viewed by a double reflection from the first mirror to the second mirror, and then to the eye of the viewer. Then, as the mirrors are moved towards and away to one another, the resulting change in the image distance imparts a third dimension to the display on the screen. This controlled movement can be synchronized with the deflection of the cathode-ray beam across the display screen of the cathode-ray tube to provide the desired three-dimensional aspect to the display.

The mechanism and aparatus of the invention has general utility. However, the invention is particularly useful in conjunction with radar systems for providing a three-dimensional display of the radar information.

It is, accordingly, an object of the present invention to provide an improved and simplified display system and mechanism in which a third dimension may be imparted to a two-dimensional display.

Another object is to provide such an improved mechanism which is relatively simple to build and which may be constructed as a relatively compact and light unit.

Another object is to provide such an improved apparatus and mechanism which is relatively simple to service and operate, and which may be sold at a relatively low price.

Yet another object is to provide such an improved mechanism which is constructed to impart the desired third dimension to the two-dimensional display without the concomitant production of distortions due to angular or rotational displacement components.

A further and specific object of the invention is to provide an improved counter-balancing mechanism which operates in a manner to assure smooth operation of the mechanism so as to obviate shock in the mechanism and the transmission of vibrations to the housing in which the mechanism is mounted.

Other objects of the invention will become apparent from a consideration of the following specification when taken in conjunction with the accompanying drawings, in which:

FIGURE 1 is a pespective view of one embodiment of the invention, and illustrating the mechanism and apparatus of the invention enclosed in an appropriate housing;

FIGURE 2 is a fragmentary side view of the mechanism, in accordance with one embodiment of the invention, and showing the manner in which the pair of mirrors is pivotally mounted in the mechanism, and the linkage used to actuate the mirrors;

FIGURE 3 is a bottom view of the linkage and mechanism of FIGURE 2;

Figure 4:
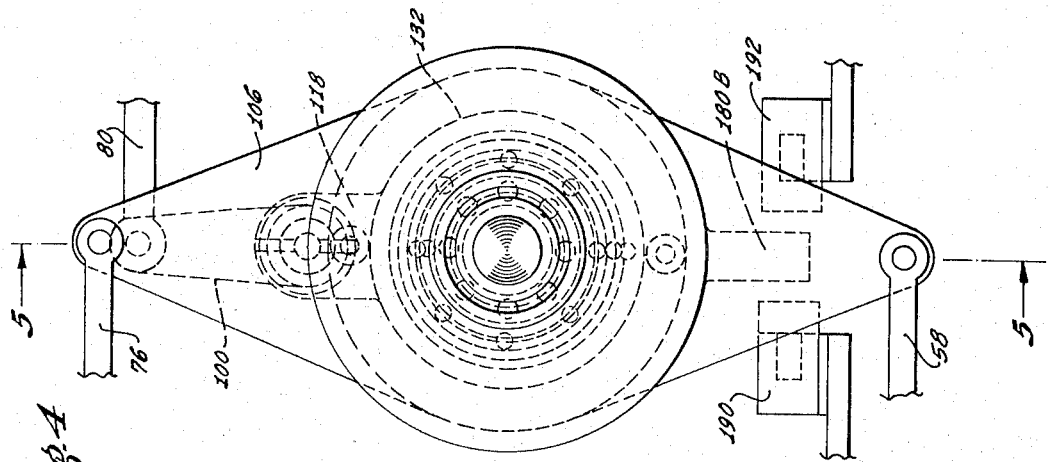
FIGURE 4 is a side view of a counter-balancing mechanism which may be incorporated into the linkage and mechanism of FIGURES 2 and 3.

FIGURE 1 illustrates the three-dimensional display apparatus of the invention mounted in a suitable housing 10. The housing 10 includes, for example, an aperture 12 through which the display screen of the apparatus may be viewed, and the housing also includes a suitable control panel 14.

The three-dimensional display mechanism and apparatus of the invention utilizes a cathode-ray tube 16 of any suitable, known type. The cathode-ray tube 16 has appropriate electronic circuitry associated with it to enable it to produce the desired display on its screen 18.

The mechanism of the invention provides an optical path to the display screen 18 by reflective means, as will be described, and provides a three-dimensional effect by effectively changing the viewing distance along the optical path between the viewer and the screen. The viewing distance is effectively changed by the controlled angular oscillation of a pair of mirrors 20 and 22.

As best shown in FIGURE 2, for example, the mirror 20 is disposed in facing relationship with the screen 18 of the cathode-ray tube 16, and the mirror 20 is tilted slightly to reflect the image of the display on the screen 18 upwardly and to the right in FIGURE 2 to the mirror 22. The mirror 22 is also tilted, but in the opposite sense, to reflect the image along a substantially horizontal path to the left in FIGURE 2.

As shown in FIGURE 1, the mirror 22 is visible through the aperture 12 in the housing 10. Therefore, a viewer looking into the mirror 22 will see the image of the display on the screen 18, as reflected by the mirror 22 to the eye of the viewer. As will be described in detail, the mirrors 20 and 22 are effectively moved towards and away from one another in a succession of cycles, and in synchronism with the deflection of the cathode-ray beam in the cathode-ray tube 16, so as to create a three-dimensional effect in the eye of the observer due to the effective change in the visual distance to the display on the screen 18 of the cathode-ray tube 16.

The mirror 20 is mounted on a support member 24 which, in turn, is supported between the lower ends of a pair of essentially vertical lever arms 26 and 28. The lever arms 26 and 28 are pivotally supported at their upper ends by a pair of stationary brackets 30 and 32; the lever arms being supported in the respective brackets by pivot pins, such as the pin 34.

The mirror 22 is mounted on a support member 38 which, in turn, is supported between the upper ends of a pair of essentially vertical lever arms 40 and 42. The lever arms 40 and 42 are pivotally supported at their lower ends by a pair of stationary brackets 44 and 46; the lever arms being pivoted to the stationary brackets by respective pivot pins 48 and 50.

A pair of essentially vertically extending lever arms 52 and 54 are pivotally mounted at their upper ends to a pair of stationary brackets 56. The lever arms 52 and 54 are pivotally coupled at their lower ends to corresponding pairs of horizontally extending connecting rods 58 and 60. The connecting rods 60 are pivotally coupled to the lower ends of the vertical levers 26 and 28.

The connecting rods 58 are pivotally coupled to the lower ends of a pair of vertical linkage members 62 and 64. The linkage members 62 and 64 are each pivotally mounted at respective points intermediate the ends thereof to stationary brackets 66 and 68; this pivotal mounting being by means of respective pivot pins 70 and 72.

The upper ends of the linkage members 62 and 64 are respectively pivotally coupled to a pair of horizontal connecting rods 74 and 76. These connecting rods are pivotally coupled to the upper ends of the linkage arms 40 and 42, respectively.

A connecting rod 80 is pivotally coupled to a cross-member 82; the cross-member 82 and a second cross-member 84 extending between the members 62 and 64 on opposite sides of the pivot pins 70 and 72. The connecting rod 80 is coupled by a pivot pin 86 to a bracket 88 on the cross-member 82. The connecting rod 80 is pivotally coupled to a crank 90 on an electric drive motor 92.

When the motor 92 is energized, the rotation of its drive shaft causes the crank 90 to impart an oscillatory motion to the connecting rod 80. The motion of the connecting rod 80 is transmitted to the linkage members 62 and 64 causing these members to oscillate angularly about the pivot pins 70 and 72.

The oscillatory movement of the upper ends of the linkage members 62 and 64 is transmitted to the connecting rods 74 and 76, and this causes the lever arms 40 and 42 to pivot about their lower pivot points so as to move the mirror 22 back and forth in an oscillatory manner.

The oscillatory movement of the lower end of the linkage members 62 and 64 is transmitted to the connecting rods 58, and then to the connecting rods 60 by virtue of the pivoted coupling between the rods 58 and the rods 60.

The rods 60 cause the lever arms 26 and 28 to rock back and forth about the upper pivot pins to move the mirror 20 back and forth in an oscillatory manner. The linkage is such that the mirrors 20 and 22 are oscillated in an out-of-phase manner so that in each oscillatory cycle, the two mirrors approach one another for the first half of the cycle, and then move away from one another during the second half of the cycle.

As shown in FIGURE 1, and as mentioned above, the mirror 22 is viewed through the aperture 12 in the housing 10 of FIGURE 1, and the opposing oscillatory movements of the mirrors 20 and 22 provides a three-dimensional effect to the resulting reflected image in the mirror 22 of the display on the screen 18 of the cathode-ray tube 16.

The illustrated linkage is such that the relative movement between the mirrors 20 and 22 is linear, and any rotational or angular displacement components are compensated. The drive of the motor 92 can be synchronized with the deflection of the cathode-ray beam in the cathode-ray tube 16 so that the Z-axis of coordinate movement is effected, in addition to the X, Y axis on the screen 18 of the cathode-ray tube. This synchronization can be achieved, for example, by energizing the motor 92 by means of a signal derived from the beam deflection circuits for the cathode-ray tube 16.

The beam deflection circuits are represented by the block 93 in FIGURE 2, and these circuits may include any desired known circuitry for developing synchronized vertical and horizontal beam deflection circuits for the cathode-ray tube 16, as well as a synchronized drive signal for the motor 92.

Figure 5:
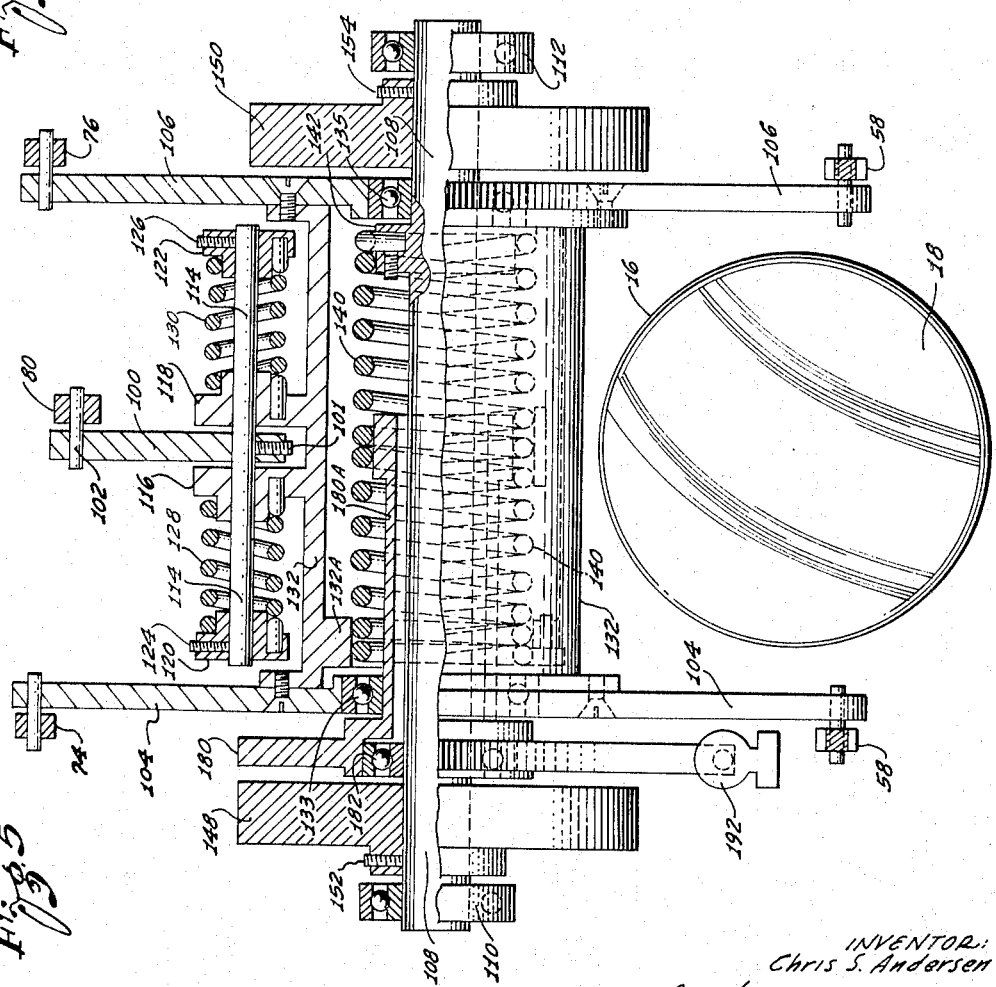
FIGURE 5 is a sectional view, substantially on the line 5—5 of FIGURE 4, of the counter-balancing mechanism of FIGURE 4.

The counter-balancing mechanism of FIGURES 4 and 5 may be incorporated into the linkage of FIGURES 2 and 3. When the counter-balancing mechanism is installed, the equipment may be started and stopped in a smooth manner, and operated in a manner such that no noticeable vibrations are transmitted to the housing or other stationary supporting means.

When the counter-balancing mechanism of FIGURES 4 and 5 is incorporated into the linkage of FIGURES 2 and 3, it replaces the linkage members 62 and 64, and their associated components.

As shown in FIGURES 4 and 5, the connecting rod 80 from the motor 92 is pivotally coupled to an arm 100 by means of a pivot pin 102. The mechanism of FIGURES 4 and 5 includes a pair of spaced lever arms 104 and 106. These lever arms are supported vertically in parallel relationship with one another, in a manner to be described.

The horizontal connecting rods 58 of FIGURES 2 and 3, instead of being pivotally coupled to the lower ends of the vertical linkage members 62 and 64, are pivotally coupled to the lower ends of the lever members 104 and 106.

Likewise, the horizontal connecting rods 74 and 76 of FIGURES 2 and 3, instead of being pivotally coupled to the upper ends of the linkage members 62 and 64, are pivotally coupled to the upper ends of the lever members 104 and 106 of FIGURES 4 and 5.

As shown in FIGURE 5, for example, the counter-balancing mechanism is mounted to straddle the cathode-ray tube 16, and to occupy the position previously occupied by the linkage members 62 and 64. The counter-balancing mechanism is mounted on a shaft 108 which, in turn, is rotatably mounted on bearings 110 and 112. The bearings are supported on stationary support brackets, not shown.

The lower end of the arm 100 is mounted on a shaft 114, and is rigid therewith by means of a set screw 101. The shaft 114 is rotatably mounted in a pair of bosses 116 and 118. A pair of collars 120 and 122 are mounted on the shaft 114 at the respective extremities thereof, and these collars are held rigid with the shaft by means of respective set screws 124 and 126. A pair of springs 128 and 130 are mounted on the shaft 114, and these springs extend coaxially with the shaft from the center to the respective ends thereof. The springs 128 and 130 are secured at one end to the bosses 116 and 118, and at the other end to the collars 120 and 122.

A hollow hub 132 is affixed to the lever members 104 and 106, and the hub extends between the lever members in coaxial surrounding relationship with the shaft 108. The bosses 116 and 118 referred to above are mounted on the hub 132, and these bosses extend radially outwardly from the hub and are spaced axially on the outer surface thereof. The lever members 104 and 106 are rotatably mounted on the shaft 108 by means of bearings 133 and 135.

The oscillatory linear movement of the connecting rod 80 is transmitted to the arm 100, and this arm transmits movement to the hub 132 to cause the lever arms 104 and 106 to oscillate angularly about the axis of the shaft 108, so as to drive the connecting rods 58, and the connecting rods 74 and 76.

The springs 128 and 130, and the rotatable shaft 114, serve to transmit the movement of the rod 80 and arm 100 to the hub 132. These springs serve to absorb the abrupt movements of the actuating arm when the apparatus is first started or stopped, and they provide for the smooth actuation of the apparatus, without shock or vibration being transmitted to the housing, during the off-resonance intervals of such starting or stopping.

The left hand end of the hub 132 has an internal annular integral flange 132a formed thereon, and this flange is attached to one end of a spring 140. The spring 140 extends inside the hub 132 and around the shaft 108 in coaxial relationship therewith. The right hand end of the spring 140 in FIGURE 5 is attached to a collar 142 on the shaft 108.

A pair of flywheel counter-weights 148 and 150 are mounted on the shaft 108 adjacent the respective ends thereof, and the flywheel counterweights are held rigid with the shaft by means of set screws 152 and 154.

The reciprocal angular movement of the lever members 104 and 106 is transmitted through the spring 140 to the counterweights 148 and 150 on the shaft 108. The counter-weights and associated components are constructed to vibrate angularly about the axis of the shaft 108 at the normal drive speed of the apparatus. This provides for the smooth actuation of the mirrors 20 and 22 in a counter-balanced manner, such that the vibrationary forces to the stationary supports and to the housing are reduced to a minimum.

In the manner described above, therefore, the flywheel counter-weights 148 and 150 serve to damp out vibrations that tend to occur at the normal operating frequency of the system. In the disclosed embodiment, additional means are provided for damping third harmonic vibrations which tend to occur, usually during conditions of acceleration or deceleration of the mechanism.

The third harmonic counter-balancing portion of the equipment includes a counter-weight 180 which is rotatably mounted on the shaft 108 by means of a bearing 182. The counter-weight 180 has a hub portion 180a which extends into the hub 132 in coaxial relationship with the shaft 108. The bearing 133 which rotatably supports the lever member 104 is actually mounted on the hub 180a, as shown.

The hub 180a extends about half-way into the hub 132, and has, for example, an enlarged shoulder at its inner extremity. This enlarged shoulder is attached, as by welding, to the central portion of the spring 140.

Any third harmonic vibrations in the system set up compensating vibrations in the counter-weight 180. The counter-weight has a lower radially extending portion 180b which extends between a pair of resilient bumpers 190 and 192. These bumpers are supported on suitable stationary brackets, and they serve to limit the vibratory movement of the counter-weight 180.

The invention provides, therefore, an improved display mechanism and apparatus which is capable of effectively controlling the image distance to the display screen of a cathode-ray tube to create a third-dimensional aspect to the representation on the screen. The mechanism of the invention is advantageous in that it is relatively simple and economical to produce, in that it can be operated and serviced in a relatively convenient manner.

The improved mechanism of the invention provides for the desired three-dimentional displays by the reciprocal movement of a pair of reflective members. In accordance with a further embodiment, an improved counter-balancing mechanism is also incorporated to suppress any tendency for the mechanism to transmit vibrations to the supporting brackets and enclosing housing.

Figure 6:
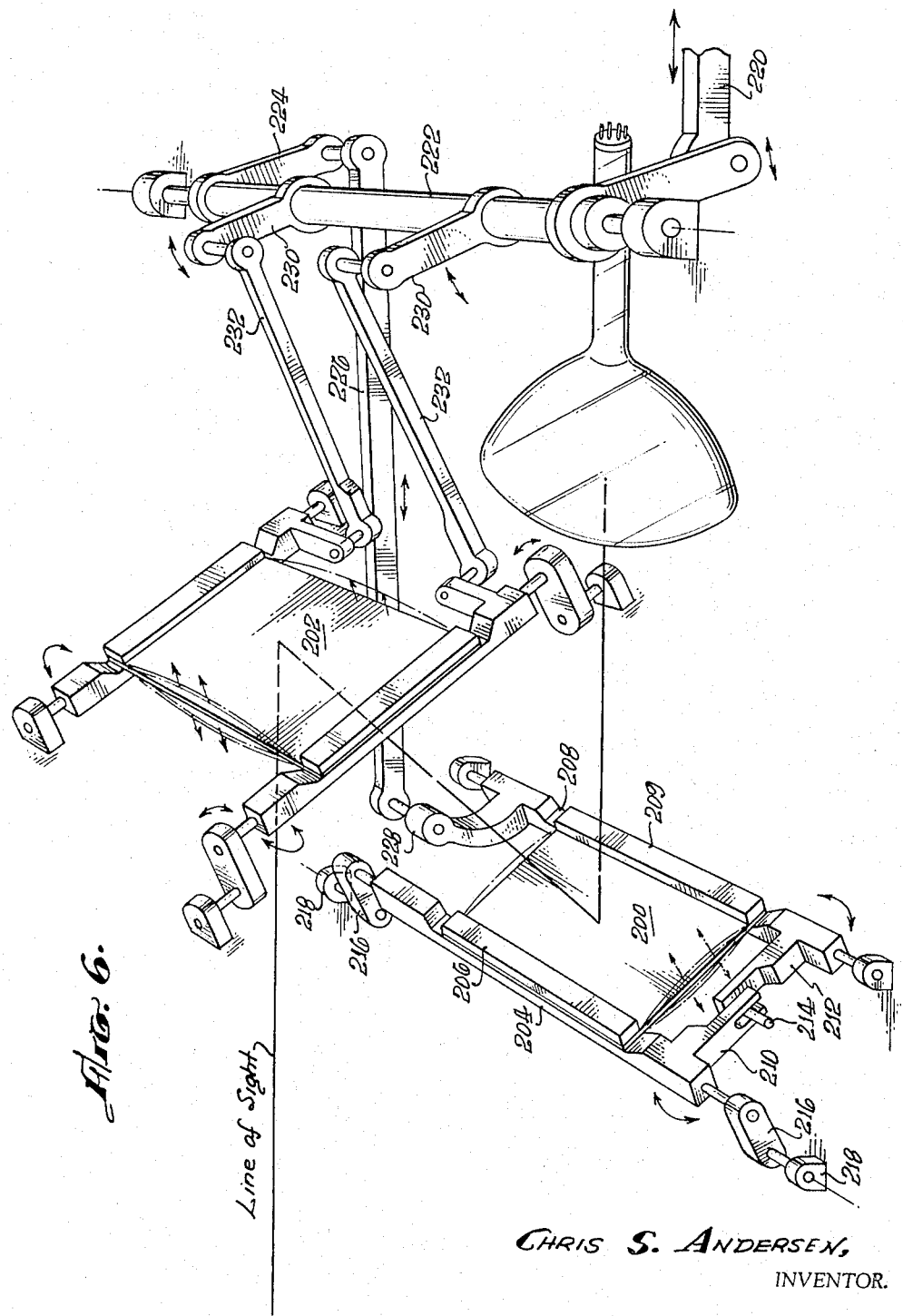
FIGURE 6 is a schematic view of an alternative embodiment, in which the mirrors are bent or flexed to produce the change in reflection.

An alternative embodiment, as shown in FIGURE 6, provides for the change of focal length of the mirrors without changing the position of the entire mass of structure surrounding the mirror element. In this embodiment, the mirror elements are grasped at the edges and caused to flex between two opposite maximum convex limits. That is, this embodiment accomplishes a three dimentional effect without optical distortions as created by the motions of a singular surface in motion. The mirror elements are represented by the reference characters 200 and 202 in FIGURE 6. The degree of amplitude is exaggerated in FIGURE 6 in order to indicate the fact that the elements 200 and 202 do operate between maximum convex conditions.

It is also an object of this embodiment to reduce the amplitude of the mechanical motions required, as it is somewhat essential to operate the display mechanisms at high speeds to reduce flicker.

The apparatus employed to cause this coordinated structure is symbolized in the drawing, and generally comprises a side rail 204 having a clamp member 206, and an opposed side rail 208 with a clamp 209.

Refer first to mirror 200. The flexible mirror element 200 is clamped at the edges thereof by the side rail structures, and is thereby caused to flex between amplitude limits by rotating the side rails, each around its longitudinal axis, and in opposite but equal degrees of rotation. Thus, the mirror element 200 is caused to flex first to one maximum convex position and then to return to the opposite maximum convex condition, passing through a planar condition in the transition.

As in the former considerations the objective accomplished by the mechanical arrangement to bend reflecting surfaces or mirrors is to cause a three dimensional effect with small mechanical motion and to allow two such surfaces as in the former configuration to be bent in directions in quadrature and in particular amplitudes to cause uniform magnifications in images formed as viewed from any angle into the display.

To compensate for changes in magnification causing the image to appear in reverse in it illusionary position in the third dimension, it is assumed, the object under view is to be altered in dimension in accordance with the bending of the mirrors. A cathode ray tube is considered to perform this function in the drawing although other mechanisms may be capable of this action.

In order to assure coordination of the drive, the rail 204 is provided with a drive arm 210, and the rail 208 with an arm 212. The arm 210 is bifurcated and receives a pin 214 which is carried by arm 212. The rail 208 is the driver arm and therefore will cause a coordinated drive of the driven rail 204.

The flexure of the mirror 200 will require the distance between the rails 204 and 208 to change, and therefore the driven rail 204 is mounted by means of connecting links 216 to bearings 218. Thus, as the mirror element 200 moves away from its true planar position, the rail 204 will move toward the rail 208, and this movement will be accommodated by the links 216.

The mirror element 202 is driven by side rails in identical manner described with respect to the mirror element 200.

A main drive arm 220 is provided to reciprocate and drive a master shaft 222 in an oscillating movement around its longitudinal axis. From the shaft 222 is taken a drive action through a crank arm 224 pivotally connected to a drive arm 226. Arm 226 in turn is pivotally connected to a drive link 228 carried by the driving shaft 208.

The mirror element 202 is driven by means of two drive cranks 230 which in turn are pivotally connected to connecting links 232 and operate the opposed rails which mount the mirror element 202.

Thus, operation of the main arm 220 will cause a coordinated flexure of the mirror elements 200 and 202 without aberrations or distortions of any kind due to inertia induced vibration. The fact that the mirror elements 200 and 202 are curved through most of the cycle of operation will be of no consequence with respect to the usefulness of the image created, because of the coordinated relationship of the elements, and the minimal possible distortion due to the small amplitude actually employed for image observation.

A three dimensional image of true proportion can be produced through the bending of mirrors as illustrated in the sketch which shows the mirrors of location as to add in quadrature the optical magnification of each mirror as altered mechanically of certain amplitude as dictated by a synchronizing linkage and driving mechanism.

A feature of this invention is the method of bending the mirrors, as can be seen are made of flexible sheets, by a mechanism of such design as to form a circular curvature of optical exactness for each mirror in one plane. This is arranged through the rotation of adjacent edges of the sheets by holding members as shown and described with each being revolved in amplitude relative to a prescribed degree so to perform optical correctness in respect to placement of the mirrors in the optical system.

The illustrated embodiments of the invention have been set forth for the purpose of teaching the fundamental concepts of the invention, and not with the intent that the invention is limited to the structural features thus shown and described. It is intended that the invention shall not be limited except to the scope of the subject matter as hereafter claimed.

In the first embodiment (FIGS. 1–5) the actual length of the optical path between screen and viewer is cyclically changed, in synchronism with the screen trace, by the opposed advance and retraction of the mirrors 20 and 22. In the second embodiment (FIG. 6), while there is slight change in the actual length of the optical path, the dominant phenomenon is an apparent change in path length due to the cyclic change in focal length of the mirrors 200 and 202.

What is claimed is:

1. Apparatus for displaying in apparent three-dimensional form a two-dimensional representation formed on the display screen of an image reproducer, said apparatus including:
   a first light-reflecting member for forming a first image of the representation on the display screen of the reproudcer;
   first pivotal mounting means for said first light-reflecting member for positioning the same in the optical path of said display screen and facing said display screen;
   a second light-reflecting member for forming a second image of said first image;
   second pivotal mounting means for said second light-reflecting member for positioning the same in the optical path from said first light reflecting member;
   and control means coupled to said first and second light-reflecting members for cyclically imparting angular movement thereto about respective pivotal axis to impart a third dimension to said second image formed by said second light-reflecting member.

2. The apparatus of claim 1 and in which said control means produces movement of said first light-reflecting member towards and away from the plane of said display screen.

3. The apparatus of claim 1 and in which said control means produces simultaneous angular movement of said first and second light reflecting members in opposite directions to move said light reflecting members towards and away from one another to compensate angular and rotational displacement components in said second image.

4. The apparatus of claim 1 in which said control means produces simultaneous cyclic angular movement of said first and second light-reflecting members but in opposite angular directions.

5. Apparatus for displaying in apparent three-dimensional form a two-dimensional representation formed on the display screen of an image reproducer, said apparatus including:
   a first light-reflecting member for forming a first image of the representation on the display screen of the reproducer;
   first pivotal mounting means including a first vertical lever member pivotally supported at its upper end and supporting said first light-reflecting member at its lower end and positioning said first light-reflecting member in a position facing said display screen and spaced therefrom;
   a second light-reflecting member for forming a second image of said first image;
   second pivotal mounting means including a second vertical lever member spaced and parallel to said first lever member and supporting said second light-reflecting member at its upper end and pivotally supported at its lower end;
   and control means including control linkage members coupled to said first and second levers for cyclically imparting simultaneous pivotal movement to the same about the respective pivotal axes thereof but in opposite angular directions.

6. The apparatus of claim 5 in which said control means produces movement of said first light-reflecting member towards and away from the plane of said display screen, and said second control means produces simultaneous movement of said second light-reflecting member towards and away from said first light-reflecting member to compensate angular and rotational displacement components in said second image.

7. Apparatus for displaying in apparent three-dimensional form a two-dimensional representation formed on the display screen of an image reproducer, said apparatus including:
   a light-reflecting member for forming an image of the representation on the display screen of said image reproducer;
   pivotal mounting means for said light-reflecting member for positioning said light-reflecting member in the optical path of said display screen and facing said display screen;
   linking means coupled to said light-reflecting member for cyclically imparting angular movement thereto about a pivotal axis so as to move said light-reflecting member towards and away from the plane of said display screen to impart a third dimension to the image formed by said light-reflecting member;
   drive means for transmitting reciprocal rectilinear movement to said linkage means;
   and a counter-balancing mechanism coupling said drive means to said linkage means, and comprising rotatably mounted flywheel counter-weight means, and resilient means for transmission vibratory angular movement to said flywheel counter-weight means from said drive means.

8. The apparatus of claim 7 in which said counter-balancing mechanism includes lever means coupled to said linkage means, a rotatably mounted arm coupled to said drive means and to said lever means for causing said lever means to oscillate angularly about an axis of rotation spaced and parallel to the axis of rotation of said arm in response to the rectilinear movement of said drive means, and spring means for resiliently biasing said arm aaginst rotation about the axis of rotation thereof by said drive means.

9. The apparatus of claim 7 in which said flywheel counter-weight means and said resilient means exhibit resonant characteristics and the selected reciprocating speed of said drive means.

10. The apparatus of claim 7 and which includes further counter-weight means mounted for rotation about the axis of rotation of said flywheel counter-weight means, and means coupling the further counter-weight means to an intermediate point on said resilient means for transmitting vibratory angular movement to said further counter-weight means about the axis of rotation thereof.

11. The apparatus of claim 10 in which said further counter-weight means and said resilient means exhibit resonant characteristics at the third harmonic of the selected reciprocating speed of said drive means.

12. Apparatus for displaying in apparent three dimensional form a two dimensional representation, including:

a first member having a reflecting surface for forming a first image of the representation;

first mounting means for said first member for positioning said first member in an optical path with its said surface facing said representation;

a second reflecting member having a reflecting surface for forming a second image from said first image;

second mounting means for said second member for positioning said second member in said optical path with its said surface facing said first member;

and control means for cyclically causing said surfaces to move toward and away from each other, thereby to impart a third dimension to said representation as viewed along said path.

13. Apparatus for displaying in apparent three-dimensional form a two-dimensional representation, including:

first mirror member having a reflecting surface for forming a first image of the representation, said mirror member having the characteristic of being continuously bendable to cause changes in magnification in a plane;

first mounting means for said first member for positioning said first member in an optical path with its said reflecting surface facing said representation, and for mechanically bending said first mirror member to form a mirror of changing magnifications;

a second reflecting mirror member having a reflecting surface positioned to form a second image from said first image;

second mounting means for said second member for positioning said second member in said optical path with its said reflecting surface facing said first member, and for bending said second mirror member to form a mirror of changing magnification; and control means for cyclically imparting synchronized bending movement to said first and second mirror members to thereby impart a third dimension to said representation as viewed along said path.

14. Apparatus in accordance with claim 13 wherein the means for holding and bending said mirror member are opposed rails grasping the side of the mirror member and rotating to bend the edges of the mirror member to form a circular shape and cause a change in optical magnification.

15. Apparatus for displaying in apparent three dimensional form a two dimensional representation comprising:

a first mirror and mounting drive means for bending same about an axis and between opposite maximum amplitudes;

a second mirror and mounting drive means for bending same about an axis and between opposite maximum amplitudes;

said first and second mirrors forming an optical image path, and being positioned such that, when viewed along said path, said axes are substantially at right angles to each other.

16. Apparatus for displaying in apparent three-dimensional form a two-dimensional representation, comprising:

means for presenting a representation which is formed by means of a cyclic trace on a screen;

a first mirror and mounting drive means for bending same about an axis and between opposite maximum amplitudes;

a second mirror and mounting drive means for bending same about an axis and between opposite maximum amplitudes;

said first and second mirrors forming an optical image path from said representation to a viewer, and being positioned such that, when viewed along said path, said axes are substantially at right angles; and means for effecting cyclic movement of said mounting drive means in synchronism with said cyclic trace.

17. Apparatus for displaying, in apparent three-dimensional form, a two-dimensional representation, comprising:

a screen;

means for making a cyclic trace on said screen;

optical path means for permitting a viewer to view said cyclic trace;

said optical path means including at least one surface for altering the character of an image conveyed along said optical path;

means for effecting a cyclic change in curvature of said surface, so as to cause all portions of said trace to cyclically appear closer and farther from the viewer; and synchronizing means for synchronizing the cyclic change in curvature of said surface with the said cyclic trace;

whereby there is imparted an apparent third dimension to the image viewed by the viewer.

18. Apparatus for displaying in apparent three-dimensional form, a two-dimensional representation, comprising:

a screen;

means for making a cyclic trace on said screen;

optical path means for permitting a viewer to view said cyclic trace;

said optical path means including a pair of surfaces for altering the character of the image conveyed along said optical path;

means for cyclically moving said surfaces toward and away from each other, so as to cause all portions of said trace to cyclically appear closer and farther from the viewer; and synchronizing means for synchronizing the cyclic movement of said surfaces with said cyclic trace;

whereby there is imparted an apparent third dimension to the image viewed by the viewer.

References Cited

UNITED STATES PATENTS

| | | | |
|---|---|---|---|
| 1,951,404 | 3/1934 | Goddard | 350—292 |
| 2,081,299 | 5/1937 | Hill | 350—295 |
| 2,465,898 | 3/1949 | Martin | 178—7.6 |
| 2,361,390 | 10/1944 | Ferrill | 178—6.5 |
| 2,521,725 | 9/1950 | Isenhour | 88—29 |
| 3,023,408 | 2/1962 | Adams | 178—6.5 |

FOREIGN PATENTS 932,327  7/1963  Great Britain.

JOHN W. CALDWELL, *Primary Examiner.*

DAVID G. REDINBAUGH, *Examiner.*

J. A. ORSINO, *Assistant Examiner.*